United States Patent
Fujisawa et al.

(10) Patent No.: US 10,744,600 B2
(45) Date of Patent: Aug. 18, 2020

(54) METAL PLATE FOR LASER PROCESSING AND METHOD FOR PRODUCING STAINLESS STEEL PLATE FOR LASER PROCESSING

(71) Applicant: NIPPON STEEL & SUMITOMO METAL CORPORATION, Tokyo (JP)

(72) Inventors: Kazuyoshi Fujisawa, Tokyo (JP); Masayuki Shibuya, Tokyo (JP); Kouichi Takeuchi, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 596 days.

(21) Appl. No.: 15/489,835

(22) Filed: Apr. 18, 2017

(65) Prior Publication Data

US 2017/0239755 A1 Aug. 24, 2017

Related U.S. Application Data

(63) Continuation of application No. 14/002,398, filed as application No. PCT/JP2012/055047 on Feb. 29, 2012, now abandoned.

(30) Foreign Application Priority Data

Mar. 1, 2011 (JP) .................. 2011-043907

(51) Int. Cl.
*B23K 26/40* (2014.01)
*C21D 9/46* (2006.01)
(Continued)

(52) U.S. Cl.
CPC ............ *B23K 26/40* (2013.01); *B05C 21/005* (2013.01); *B21B 1/26* (2013.01); *B21B 1/38* (2013.01);
(Continued)

(58) Field of Classification Search
CPC ..................................................... B23K 26/14
See application file for complete search history.

(56) References Cited

U.S. PATENT DOCUMENTS 5,909,979 A 6/1999 Winzen
2001/0003293 A1 6/2001 Hirata et al.
(Continued)

FOREIGN PATENT DOCUMENTS

CN 1107896 9/1995
CN 1156065 8/1997
(Continued)

OTHER PUBLICATIONS

English machine translation of JP 2000309856 A of Watanabe published Nov. 7, 2000 (Year: 2000).*

(Continued)

*Primary Examiner* — Keith D. Hendricks
*Assistant Examiner* — Jophy S. Koshy
(74) *Attorney, Agent, or Firm* — Clark & Brody LP

(57) ABSTRACT

A metal plate for laser processing (such as a stainless steel plate or a titanium plate) and preferably an austenitic stainless steel plate suitable for use as a metal mask or the like which undergoes fine processing with a laser has an average grain diameter d (μm) and a plate thickness t (μm) which satisfy the equation d≤0.0448·t−1.28.

1 Claim, 2 Drawing Sheets

(51) Int. Cl.
| | |
|---|---|
| C22C 38/00 | (2006.01) |
| C22C 38/02 | (2006.01) |
| C22C 38/04 | (2006.01) |
| C22C 38/48 | (2006.01) |
| C21D 8/02 | (2006.01) |
| C21D 1/30 | (2006.01) |
| C22C 14/00 | (2006.01) |
| C22F 1/18 | (2006.01) |
| C22C 38/40 | (2006.01) |
| C22C 38/38 | (2006.01) |
| C22C 38/58 | (2006.01) |
| C22C 38/18 | (2006.01) |
| C21D 1/28 | (2006.01) |
| B23K 3/06 | (2006.01) |
| B23K 26/384 | (2014.01) |
| B23K 26/14 | (2014.01) |
| B23K 1/00 | (2006.01) |
| B05C 21/00 | (2006.01) |
| B21B 1/26 | (2006.01) |
| B23K 3/08 | (2006.01) |
| B23K 26/382 | (2014.01) |
| B21B 1/38 | (2006.01) |
| B23K 101/42 | (2006.01) |
| B23K 103/04 | (2006.01) |
| B23K 103/14 | (2006.01) |
| B23K 101/18 | (2006.01) |
| B23K 103/10 | (2006.01) |
| B23K 103/18 | (2006.01) |

(52) U.S. Cl.
CPC .......... *B23K 1/0016* (2013.01); *B23K 3/0638* (2013.01); *B23K 3/08* (2013.01); *B23K 26/14* (2013.01); *B23K 26/382* (2015.10); *B23K 26/384* (2015.10); *C21D 1/28* (2013.01); *C21D 1/30* (2013.01); *C21D 8/0226* (2013.01); *C21D 8/0236* (2013.01); *C21D 8/0247* (2013.01); *C21D 8/0273* (2013.01); *C21D 9/46* (2013.01); *C22C 14/00* (2013.01); *C22C 38/001* (2013.01); *C22C 38/02* (2013.01); *C22C 38/04* (2013.01); *C22C 38/18* (2013.01); *C22C 38/38* (2013.01); *C22C 38/40* (2013.01); *C22C 38/48* (2013.01); *C22C 38/58* (2013.01); *C22F 1/183* (2013.01); *B21B 2001/386* (2013.01); *B23K 2101/18* (2018.08); *B23K 2101/42* (2018.08); *B23K 2103/05* (2018.08); *B23K 2103/10* (2018.08); *B23K 2103/14* (2018.08); *B23K 2103/26* (2018.08); *C21D 2211/001* (2013.01); *C21D 2211/005* (2013.01); *C21D 2261/00* (2013.01); *C22C 38/002* (2013.01); *Y10T 428/12* (2015.01); *Y10T 428/12361* (2015.01)

(56) References Cited

U.S. PATENT DOCUMENTS

| | | |
|---|---|---|
| 2003/0196735 A1 | 10/2003 | Sugiura et al. |
| 2005/0123745 A1 | 6/2005 | Takahashi |
| 2009/0032507 A1 | 2/2009 | Mase et al. |
| 2011/0061777 A1 | 3/2011 | Ishii et al. |
| 2013/0269838 A1 | 10/2013 | Kawano et al. |
| 2015/0152538 A1 | 6/2015 | Takebe et al. |

FOREIGN PATENT DOCUMENTS

| | | |
|---|---|---|
| EP | 1 394 280 | 3/2004 |
| EP | 1 657 321 | 5/2006 |
| JP | 60-043429 | 3/1985 |
| JP | 06-039988 | 2/1994 |
| JP | 07-150274 | 6/1995 |
| JP | 09-248976 | 9/1997 |
| JP | 2870399 | 3/1999 |
| JP | 2000-309856 | 11/2000 |
| JP | 2004-131743 | 4/2004 |
| JP | 2004-276435 | 10/2004 |
| JP | 2005-320587 | 11/2005 |
| JP | 2008-095639 | 4/2008 |
| JP | 2011-148253 | 8/2011 |
| WO | 2009/025125 | 2/2009 |

OTHER PUBLICATIONS

English machine translation of JP 2011148253 A of Mihashi published Aug. 4, 2011 (Year: 2011).*

* cited by examiner

FIGURE 1
```
[hot-rolled steel strip] → [1st intermediate annealing] → [1st intermediate rolling]
   (3.0 mm)              (continuous annealing and pickling)
→ [2nd intermediate annealing] → [2nd intermediate rolling] → [final annealing]
   (continuous annealing and pickling)                        (bright annealing)
→ [temper rolling] → [straightening] → [stress relief annealing]
   (0.25mm)                            (bright annealing)
```
FIGURE 2(A)
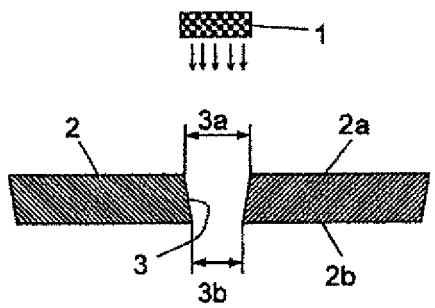
FIGURE 2(B)
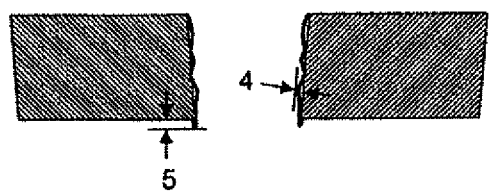

METAL PLATE FOR LASER PROCESSING AND METHOD FOR PRODUCING STAINLESS STEEL PLATE FOR LASER PROCESSING

This application is a Continuation of U.S. Ser. No. 14/002,398 filed on Aug. 30, 2013, which is a national phase of PCT/JP2012/055047 filed on Feb. 29, 2012.

TECHNICAL FIELD

This invention relates to a metal plate for a laser processed metal mask such as an austenitic stainless steel plate for laser processing which is suitable for use as a metal mask or the like which undergoes precision processing with a laser and to a method for producing a stainless steel plate for a laser processed metal mask.

BACKGROUND ART

A laser cut metal mask is a metal plate which has small holes (or slits) in a prescribed patterned image which are formed by melting and boring holes in a portion of a metal plate by irradiating the metal plate with a laser beam. It is primarily used for screen printing of solder paste (solder cream) on a circuit board such as a printed wiring board with a squeegee, but it is also used in other applications such as printing of electrically conductive ink. Plates made of stainless steel, titanium, titanium alloys, aluminum, aluminum alloys, nickel, and the like are used as metal plates. In the past, holes were formed in a metal mask by etching, but with the spread of laser processing machines, laser cut metal masks in which it is possible to form holes with higher precision have come to be much used.

Stainless steel is widely used as a metal plate for metal masks manufactured by etching or laser processing because it has excellent mechanical strength and corrosion resistance. In recent years, as the performance of laser processing machines has improved, not only has there been an increase in processing accuracy but it has also become possible to cope with short deadlines for orders. As a result, the demand for laser cut metal masks made of stainless steel is increasing.

Technical advances in laser processing machines have result in increases in the processing accuracy of small holes in a laser cut metal mask and the ability to prevent warping due to heat. As a result of these advances, the processing accuracy of laser cut metal masks has been further increasing.

Patent Document 1 discloses that when irradiating a metal plate with a laser beam to form a patterned image having small holes in the metal plate, by suppressing the focal spot diameter of the irradiated laser beam to at most 40 μm and setting the distance between the focal point of the laser beam during processing and the surface of the metal plate on the incident side of the laser beam in the range of −200 to +300 μm, the difference between the diameter of small holes which constitute a patterned image on the incident side of the laser beam and the diameter of the holes on the exit side of the laser beam (referred to in this description as hole spreading) is suppressed to at most 10% of the thickness of the metal plate.

Patent Document 2 discloses a method of manufacturing a laser cut metal mask for screen printing by irradiating a metal plate with a laser beam to melt a portion of the metal plate and bore it to create small holes to form a patterned image and then performing grinding by sandblasting of the surface of the metal plate. When a laser cut metal mask is manufactured by this method, no dross remains, so the rear surface of the mask can contact the printed surface of an object to be printed. In addition, since the surface is textured due to sandblasting, the mask easily releases from the object being printed and the speed of printing can be increased.

Patent Document 3 proposes employing chemical polishing to remove dross or the like which is formed on the rear surface by laser processing.

As shown by Patent Documents 1-3, up to now, the performance of laser cut metal masks has been improved by increasing the processing accuracy of small holes by improvements in laser processing methods such as technical advances in processing tools by carrying out mechanical and/or chemical processing of a metal mask after laser processing in order to stabilize the amount of solder which is supplied through the holes.

PRIOR ART DOCUMENTS

Patent Documents

Patent Document 1: JP 9-248976 A
Patent Document 2: JP 6-39988 A
Patent Document 3: JP 2011-148253 A

SUMMARY OF THE INVENTION

Thus far, there have been almost no disclosures of developments of metal plates which can increase the accuracy of laser processing of small holes in a laser cut metal mask, and there were no metal plates (such as stainless steel plates) which were suited for laser processing of small holes with high accuracy. There were also no metal plates which were suitable for mechanical or chemical processing after laser processing.

For these reasons, as proposed in Patent Document 1, it has been attempted to increase the processing accuracy of laser processing of small holes in a laser cut metal mask by decreasing the focal spot diameter of irradiated laser light or by employing a pulsed laser and suppressing the heat input during laser processing so as to prevent strains due to heat. Alternatively, as proposed in Patent Documents 2 and 3, it has been proposed to increase performance by optimizing the conditions of mechanical or chemical polishing after laser processing.

However, these prior art methods could not avoid decreases in the speed of processing, the processing costs of laser cut metal masks greatly increased, and productivity greatly decreased.

In addition to electrolytic/chemical polishing or mechanical polishing in order to remove dross or burrs which are produced on the rear surface by laser processing, treatment after laser processing has included imparting a mirror finish to the front surface in order to improve squeegee properties (the uniformity of supply of solder by a squeegee). These treatments increased the time required for operations and costs.

An object of the present invention is to provide a metal plate for laser processing and particularly an austenitic stainless steel plate for laser processing suitable for use as a metal mask or the like which undergoes precision processing with a laser, and a method for producing a stainless steel plate for laser processing. Specifically, an object of the present invention is to provide a metal plate and preferably an austenitic stainless steel plate for laser processing which has excellent laser processability and which can be used to manufacture a laser cut metal mask having increased dimensional accuracy of the cross section of openings (for example, hole spreading with respect to a plate thickness of 250 μm of at most 25 μm which is an accuracy of at most 10%) and which is also suitable for forming fine slits, and a method for producing this stainless steel plate.

The main purpose of laser processing in the present invention is laser processing of a metal plate which is utilized in the manufacture of a metal mask having small holes as used in screen printing.

The present inventors found that the above-described objects can be achieved by making the grain diameter of a metal plate at most a certain limit which depends on the plate thickness.

The present invention is a metal plate and preferably an austenitic stainless steel plate for a laser processed metal mask characterized in that the average grain diameter d (μm) and the thickness t of the plate (μm) satisfy the following Equation (1):

$$d \leq 0.0448 \cdot t - 1.28 \qquad (1)$$

From another standpoint, the present invention is a method of producing an austenitic stainless steel plate for a laser processed metal mask characterized by carrying out hot rolling, cold rolling, and annealing of an austenitic stainless steel to obtain an austenitic stainless steel plate, carrying out temper rolling of the stainless steel plate with a reduction of at least 20%, and if necessary carrying out stress relief annealing after temper rolling at a temperature of 500-820° C. for 20-150 seconds. There is substantially no change in the average grain diameter of the austenitic stainless steel plate during the temper rolling and stress relief annealing, so the average grain diameter of the cold-rolled steel sheet obtained by carrying out hot rolling, cold rolling, and annealing is made to satisfy above Equation (1). To this end, it is preferable to carry out cold rolling (when cold rolling is carried out two or more times, the final cold rolling before temper rolling) with a reduction of at least 30% and carry out annealing (when annealing is carried out two or more times, the final annealing before temper rolling) by soaking at a temperature of 800-950° C. for 25-70 seconds.

According to the present invention, a metal plate for laser processing which is suitable for use as a metal mask or the like which is manufactured by precision processing with a laser and particularly an austenitic stainless steel plate for laser processing which has a high strength and which can achieve small holes having a high processing accuracy are provided.

Because a metal plate for laser processing according to the present invention decreases the need to suppress heat input by increasing the processing accuracy of laser processing, the speed of laser processing can be increased. As a result, the productivity of laser cut metal masks can be increased and processing costs can be decreased.

Up to now, the processing accuracy of laser processing depended upon the laser apparatus or the processing conditions. According to the present invention, the processing accuracy of laser processing can also be increased by controlling the average grain diameter d (μm) of a metal plate for laser processing and the plate thickness t (μm) so as to satisfy above Equation (1).

With many austenitic stainless steel plates, it was found that refining crystal grains provides the effects that the amount of dross which adheres to the inner surface of the small holes which are formed by laser processing is decreased and the height of burrs which are formed on the peripheral surface of the small holes on the rear surface (the exit side with respect to the laser) is lowered. As a result, processing such as removal of dross and burrs by electrolytic or chemical polishing and smoothing of the inner surface of the holes or the squeegee surface (forming a mirror finish) can be carried out in a shorter length of time, and it is possible to shorten the time for manufacturing a laser cut metal mask (shorten the delivery date) and reduce costs. Therefore, the practical significance of the present invention is extremely great.

BRIEF EXPLANATION OF THE DRAWINGS

FIG. 1 is an explanatory view showing a method for producing an austenitic stainless steel plate used in an example.

FIG. 2(A) is an explanatory view schematically showing the state when boring small holes in a stainless steel plate by laser processing, and FIG. 2(B) is an explanatory view showing the state of dross and burrs formed in small holes which are formed by laser processing.

In FIGS. 2(A) and 2(B), 1: laser, 2: stainless steel plate, 2a: incident surface of laser beam, 2b: exit surface of laser beam, 3: small hole, 3a: width of cutting (cutting diameter) on incident side, 3b: width of cutting (cutting diameter) on exit side, 4: maximum dross thickness, 5: maximum burr height.

MODES FOR CARRYING OUT THE INVENTION

Figure 3:
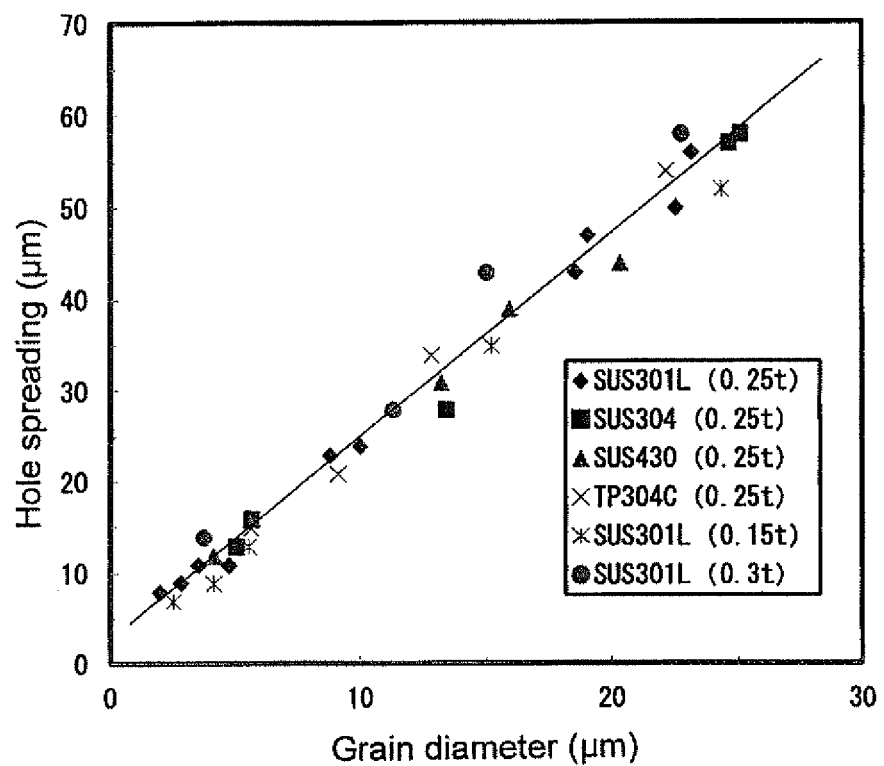
FIG. 3 is a graph showing the relationship between the average grain diameter of a metal plate and the amount of hole spreading.

Below, the present invention will be explained more specifically while referring to the accompanying drawings. In the following explanation, an example will be given of the case in which a metal plate which is a material being processed is a stainless steel plate and particularly an austenitic stainless steel plate. However, a metal plate in the present invention is not limited to a stainless steel plate. For example, the present invention can be applied in the same manner to a metal plate other than a stainless steel plate such as a titanium or titanium alloy plate, a pure nickel plate, an aluminum plate, or an aluminum alloy plate, although a method for producing an austenitic stainless steel plate for laser processing according to the present invention and particularly conditions for each step are not applicable to a metal plate other than an austenitic stainless steel plate.

From the standpoints of strength and rust resistance, a stainless steel plate is preferably an austenitic stainless steel plate, but it is also possible to use a ferritic stainless steel. Cold-rolled stainless steel plates including austenitic types are prescribed by JIS G 4305. Among austenitic stainless steel plates, temper rolled materials of SUS 301, SUS 304, SUS 301L, and SUS 304L, and SUS 301-CSP and SUS 304-CSP which are prescribed by JIS G 4313 (stainless steel strip for springs) are preferred because their grains are easily refined.

The chemical compositions of these austenitic stainless steels are given below. In the following explanation, percent with respect to chemical composition means mass percent.

[SUS 301]

C: at most 0.15%, Si: at most 1.00%, Mn: at most 2.00%, P: at most 0.045%, S: at most 0.030%, Ni: 6.00-8.00%, Cr: 16.00-18.00%, remainder of Fe and impurities.

[SUS 301L]

C: at most 0.030%, Si: at most 1.00%, Mn: at most 2.00%, P: at most 0.045%, S: at most 0.030%, Ni: 6.00-8.00%, Cr: 16.00-18.00%, N: at most 0.20%, remainder of Fe and impurities.

[SUS 304]

C: at most 0.08%, Si: at most 1.00%, Mn: at most 2.00%, P: at most 0.045%, S: at most 0.030%, Ni: 8.00-10.50%, Cr: 18.0-20.0%, remainder of Fe and impurities.

[SUS 304L]

C: at most 0.030%, Si: at most 1.00%, Mn: at most 2.00%, P: at most 0.045%, S: at most 0.030%, Ni: 9.00-13.00%, Cr: 18.00-20.00%, remainder of Fe and impurities.

[SUS 301-CSP]

C: at most 0.15%, Si: at most 1.00%, Mn: at most 2.00%, P: at most 0.045%, S: at most 0.030%, Ni: 6.00-8.00%, Cr: 16.00-18.00%, remainder of Fe and impurities.

[SUS 304-CSP]

C: at most 0.08%, Si: at most 1.00%, Mn: at most 2.00%, P: at most 0.045%, S: at most 0.030%, Ni: 8.00-10.50%, Cr: 18.00-20.00%, remainder of Fe and impurities.

In each of the above compositions, one or more elements selected from Ti, Nb, and V in an amount of at most 0.5% may be contained in place of Fe in the composition. By containing these elements, the effects of refinement of crystal grains and prevention of precipitation of a harmful chromium carbide can be expected. In order to increase strength, it is also possible to contain at least one of Mo in an amount of at most 5%, Cu in an amount of at most 5%, and Mn in an amount of at most 10%.

In place of Fe in each of the above compositions, it is possible to contain 30-90 ppm of S. As a result, laser processability is improved and the effect of decreasing the amount of burrs and dross on the rear surface is obtained.

The mechanism by which S improves laser processability is not known, but it is conjectured that promotion of melting in the depth direction by a change in the convection pattern of metal which has been melted by a laser and the formation of low melting point compounds such as FeS contribute to the improvement.

In order to obtain the above-described effects of S, it is effective to contain at least 30 ppm of S, and it is preferable to contain at least 40 ppm of S. If the S content is too high, hot workability and corrosion resistance decrease, so an upper limit of around 90 ppm is appropriate.

In an austenitic stainless steel plate for laser processing according to the present invention, the average grain diameter d (μm) and the plate thickness t (μm) satisfy the following Equation (1):

$$d \leq 0.0448 \cdot t - 1.28 \qquad (1)$$

The same applies when the metal plate is a material other than an austenitic stainless steel plate such as a ferritic stainless steel plate, a titanium plate, a titanium alloy plate, or the like. The reason why will be explained below.

FIG. 2(A) is an explanatory view schematically showing a state when boring small holes 3 in a stainless steel plate 2 by laser processing.

As shown in this figure, when a laser 1 irradiates the laser incident surface 2a of a stainless steel plate 2, metal is melted by the energy of the laser 1 towards the exit surface 2b which is the rear surface, and small holes 3 are bored in the stainless steel plate 2.

The problem with respect to processing accuracy which occurs in laser processing is that the dimensional accuracy of the small holes 3 formed by laser processing decreases due to the cut width (the diameter of a small hole in the case of a circular hole) 3a on the incident surface 2a of the stainless steel plate 2 which is irradiated by laser 1 becoming larger than the cut width 3b on the exit side 2b which is the rear surface, namely, due to an increase in the spreading (3a minus 3b) of the small holes.

The present inventors discovered that by refining the grains of a stainless steel plate 2, melting which is produced by a laser 1 is limited to a narrow region, whereby the processing accuracy of small holes 3 can be increased. As a result, the need to limit the amount of heat input during laser processing is decreased, and the processing speed can be increased. The reasons why are not clear but are thought to be as follows.

Spreading on the surface 2a of the stainless steel plate 2 which is irradiated by a laser 1 is due to the fact that light of the laser 1 in an area which is irradiated by the laser 1 is absorbed by the stainless steel 2 while repeatedly being reflected. Therefore, a larger amount of the laser energy is absorbed in the vicinity of the irradiated surface 2a.

The grain boundaries of the individual crystal grains of the stainless steel plate 2 have a lower melting point than the inside of the crystal grains due to the grain boundaries containing more impurities. Therefore, melting of the stainless steel plate 2 is thought to occur such that when the crystal grains are irradiated with a laser, the grain boundaries initially melt, thereby causing the entire crystal grains to drop off from the plate. As a result, spreading on the irradiated surface 2a is thought to be around the size of one crystal grain.

When temper rolling is carried out after final annealing, crystal grains are deformed by temper rolling, but the prior grain boundaries which contain a large amount of impurities are not changed by the subsequent stress relief annealing. Therefore, it is conjectured that spreading is still about the size of one crystal grain.

The graph in FIG. 3 illustrates data from the below-described examples. It shows the relationship between the average grain diameter (indicated as the grain diameter in the figure) and the amount of spreading of small holes in austenitic stainless steel plates made of SUS 301L and SUS 304, in ferritic stainless steel plates made of SUS 430, and in titanium plates made of TP 340C. As is clear from FIG. 3, it was found that hole spreading is determined solely by the grain diameter regardless of the type of metal or plate thickness.

From the graph in FIG. 3, it can be seen that the relationship W=2.23·d+2.85 (the solid line in the figure) exists between the average grain diameter d (μm) and the amount of hole spreading W (μm). The amount of hole spreading W (μm) of a metal mask is generally thought to be satisfactory if it is at most 10% of the plate thickness t (μm), namely, if the relationship W≤0.1·t is established as disclosed in Patent Document 1. Based on the above, good laser processability is obtained if the average grain diameter d (μm) and the plate thickness t (μm) satisfy Equation (1):

$$d \leq 0.0448 \cdot t - 1.28 \qquad (1)$$

Measurement of the average grain diameter d is carried out at the center of the plate thickness in a cross section perpendicular to the rolling direction. It is evaluated by the cutting method described in JIS G 0551.

If the average grain diameter d (μm) of an austenitic stainless steel plate 2 and the plate thickness t (μm) do not satisfy above Equation (1), hole spreading increases, metal melts by the laser 1 over a wide region, and the processing accuracy of small holes 3 becomes poor. Therefore, in the present invention, it is necessary to satisfy the relationship of Equation (1).

In a preferred mode of the present invention, the amount of hole spreading W (μm) is made a small value of at most 7% of the plate thickness t (μm), and the accuracy of laser processing is increased to that extent. In this case, the relationship W≤0.07·t is established, and the average grain diameter d (μm) and the plate thickness t (μm) satisfy the following Equation (1').

$$d \leq 0.0314 \cdot t - 1.28 \quad (1')$$

More preferably, the amount of hole spreading W (μm) is a still smaller value of at most 5% of the plate thickness t (μm). In this case, W≤0.05·t is established, and the average grain diameter d (μm) and the plate thickness t (μm) satisfy the following Equation (1").

$$d \leq 0.0224 \cdot t - 1.28 \quad (1'')$$

FIG. 2(B) is an explanatory view showing the state of dross and burrs which are unavoidably formed in small holes bored by laser processing. Dross and burrs are formed by molten metal adhering to the small holes, with dross adhering to the inner surface of the small holes and burrs hanging from the periphery of the small holes on the exit side of a laser beam. They are removed by chemical polishing or electrolytic polishing carried out after processing. Accordingly, the maximum dross thickness 4 and the maximum burr height 5 in the figure are preferably as small as possible. As stated above, in the present invention, the average grain diameter of the metal plate is small, so the maximum dross thickness and the maximum burr height are decreased, and removal of dross and burrs becomes easier.

FIG. 1 is an explanatory diagram of a process for producing an austenitic stainless steel for laser processing (and preferably for a metal mask) used in examples which illustrate the effects of the present invention.

First, an ingot made of an austenitic stainless steel by melting and casting is subjected to hot rolling to form a hot-rolled steel strip having a sheet thickness of 3.0 mm, for example. Then, as indicated in FIG. 1 by first intermediate annealing→first intermediate rolling→second intermediate annealing→second intermediate rolling→final annealing, cold rolling and annealing are carried out at least one time each to obtain a cold-rolled austenitic stainless steel plate having a desired plate thickness. Cold rolling and annealing are normally carried out around 2-3 times. The annealing after the final cold rolling is final annealing, which is normally carried out by bright annealing (annealing which is performed in an inert gas or a vacuum in order to prevent oxidation of the surface of the steel plate). The intermediate annealing prior to this is carried out by continuous annealing in air, and after the annealing, the steel plate is pickled to remove scale from its surface.

The reduction in final cold rolling which is carried out before temper rolling (the second intermediate rolling in FIG. 1) is preferably at least 30%. This is because introduction of working strains contributes to crystal grain refinement after annealing. The reduction in the final cold rolling is preferably at least 50% and more preferably at least 60%. The final annealing after final cold rolling (annealing before temper rolling) is preferably carried out under conditions which are set so as to obtain an average grain diameter which satisfies above Equation (1). Specifically, carrying out final annealing by soaking for 25-70 seconds at a low temperature in the vicinity of the recrystallization temperature range (800-950° C. in the case of an austenitic stainless steel) is preferable because it can suppress grain growth. If the annealing temperature is lower than 800° C., unrecrystallized grains are also present, and they cause cracking at the time of forming and a decrease in workability. On the other hand, if the final annealing temperature exceeds 950° C., it becomes difficult for the average grain diameter to satisfy above Equation (1). When the plate thickness is 250 μm (0.25 mm), the average grain diameter of the cold-rolled austenitic stainless steel after final annealing is preferably at most 10 μm.

If necessary, temper rolling with a reduction of at least 20% is carried out on the resulting cold-rolled austenitic stainless steel plate to adjust the plate thickness and hardness. Temper rolling is carried out in a cold state. Temper rolling increases the strength of the material and improves durability when the material is used as a metal mask, and it also improves resistance to scratching during use. In the case of a stainless steel plate, the hardness of the material surface is preferably a Vickers hardness of at least 300 HV, the hardness is usually at least 330 HV, and more preferably a hardness of at least 360 HV is recommended. From this standpoint, the elongation in temper rolling is preferably around 20-60%. The plate thickness after temper rolling can be made 100-400 μm (0.1-0.4 mm), for example. In the present invention, the thinner the plate thickness, the smaller the average grain diameter needs to be.

Adjusting the surface roughness of the work roll used in temper rolling makes it possible to control the surface roughness of the rolled plate. When the plate is used as a metal mask, the surface roughness of the plate is preferably smooth from the standpoints of slidability of a squeegee and preventing adhesion and retention of solder paste and the like on the metal mask. The surface roughness of the steel plate after temper rolling is preferably at most 0.16 μm as a centerline surface roughness (Ra), and normally it is at most 0.10 μm. Ra is more preferably at most 0.08 μm.

Then, if necessary, straightening with a tension leveler and stress relief annealing are carried out or tension annealing is carried out with the object of straightening and stress relief annealing.

If the temperature of stress relief annealing is less than 500° C., strains are not sufficiently removed and warping easily develops at the time of laser processing, while if it exceeds 820° C., dislocations start to disappear and softening of the plate rapidly progresses. If the length of stress relief annealing is less than 5 seconds, the temperature of the steel plate does not reach the set temperature, while if it exceeds 150 seconds, productivity deteriorates. Therefore, stress relief annealing is preferably carried out under conditions of 500-820° C. for 5-150 seconds. Stress relief annealing is more preferably carried out under conditions of 600-820° C. for 10-150 seconds and still more preferably under conditions of 700-820° C. for 10-150 seconds.

If temper rolling is carried out, residual stresses within the steel plate become large in the surface portion of the steel plate and become smaller at the center of the plate thickness. However, flatness of the steel plate is maintained by balancing the residual stresses in the surface portions between the front surface and the rear surface. On the other hand, if the area of the surface on one side of a steel plate is different from that on the other side as is the case when laser processing is carried out after half etching (treatment in which a portion of a plate is etched to locally decrease the plate thickness; in the case of a metal mask, it is sometimes carried out with the object of decreasing the amount of solder which is printed) or when there is a large difference between the hole diameter on the laser incident surface and the rear surface after laser processing (when there is a large amount of hole spreading), the balance between the residual stresses in the two surfaces is upset, and the steel plate easily warps. In this case, the residual stress in the interior can be decreased and the flatness of the steel plate is improved by carrying out stress relief annealing. Accordingly, stress relief annealing is not an essential step and can be carried out as necessary.

In the same manner as with an austenitic stainless steel plate, in the case of a ferritic stainless steel plate, by carrying out final annealing before temper rolling at a low temperature (such as 700-820° C.) in the vicinity of the recrystallization temperature region, grain growth is suppressed and a steel plate having the desired fine grain structure can be produced. This ferritic stainless steel plate next undergoes temper rolling with a reduction of at least 20% to adjust the plate thickness and hardness as necessary. The plate thickness and surface roughness after temper rolling may be the same as for an austenitic stainless steel plate, and stress relief annealing is preferably subsequently carried out as is the case with an austenitic stainless steel plate.

In the case of a titanium or titanium alloy plate, by carrying out final annealing before temper rolling at a low temperature (550-700° C. in the case of a titanium plate) in the vicinity of the recrystallization temperature range, grain growth is suppressed and a metal plate having a desired fine grain structure can be manufactured. This titanium plate then undergoes temper rolling with a reduction of at least 20% to adjust the plate thickness and hardness as necessary. The plate thickness and surface roughness after temper rolling can be the same as described above. Then, it is preferable to carry out stress relief annealing as described above.

In the above explanation, examples were given of an austenitic stainless steel plate, a ferritic stainless steel plate, a titanium plate, and a titanium alloy plate. In the case of metal plates other than those described above (such as a martensitic stainless steel plate, a pure nickel plate, an aluminum plate, or an aluminum alloy plate), crystal grains like those described above are present, and the relationship given by $W = 2.23 \cdot d + 2.85$ is established between the average grain diameter d (μm) and the hole spreading W (μm). Therefore, by having the average grain diameter d (μm) and the plate thickness t (μm) satisfy the following Equation (1)

$$d \leq 0.0448 \cdot t - 1.28 \quad (1)$$

it becomes possible to perform melting over a narrow region by laser irradiation. As a result, it is possible to increase the processing accuracy of small holes.

EXAMPLES

The present invention will be explained more concretely by examples.

Austenitic stainless steels A1, A2, B1, and B2 and ferritic stainless steel C having the chemical compositions shown in Table 1 were melted and formed into slabs, and hot rolling was carried out by usual methods. Austenitic stainless steels A1 and A2 were SUS 301L-based steels, austenitic stainless steels B1 and B2 were those of SUS 304, and ferritic stainless steel C was a SUS 430 steel. The resulting hot-rolled steel plates underwent annealing and descaling in an annealing and pickling line, and then they underwent cold rolling and annealing two times while varying the final cold rolling reduction and the final annealing temperature as shown in Table 3 to obtain stainless steel plates having a thickness of 150-300 μm (0.15-0.30 mm).

Separately, a titanium material having the chemical composition shown in Table 2 underwent VAR melting and then underwent forging and hot rolling in a conventional manner. The resulting hot-rolled material underwent annealing and descaling in an annealing and pickling line, and then cold rolling and annealing were performed two times. The final cold rolling reduction and the final annealing temperature were varied as shown in Table 3 to obtain titanium plates having a thickness of 250 μm (0.25 mm).

TABLE 1

| Mark | Chemical composition (mass %, remainder of Fe and impurities) | | | | | | | | | Remark |
| | C | Si | Mn | P | S | Ni | Cr | N | Nb | |
|---|---|---|---|---|---|---|---|---|---|---|
| A1 | 0.014 | 0.35 | 1.15 | 0.027 | 0.004 | 6.60 | 17.30 | 0.118 | 0.040 | SUS301L |
| A2 | 0.013 | 0.37 | 1.21 | 0.028 | 0.002 | 6.69 | 17.38 | 0.122 | 0.046 | base |
| B1 | 0.050 | 0.38 | 1.04 | 0.029 | 0.005 | 8.06 | 18.22 | — | — | SUS304 |
| B2 | 0.047 | 0.39 | 1.03 | 0.027 | 0.001 | 8.05 | 18.09 | — | — | |
| C | 0.060 | 0.33 | 0.25 | 0.026 | 0.001 | — | 16.28 | — | — | SUS430 |

TABLE 2

| Mark | Chemical composition (mass %, remainder of Ti and impurities) | | | | | Remark |
| | C | H | O | N | Fe | |
|---|---|---|---|---|---|---|
| D | 0.010 | 0.001 | 0.05 | 0.005 | 0.06 | TP340C |

After final annealing, the cold-rolled stainless steel plates or titanium plates underwent temper rolling with the reduction shown in Table 3. Temper rolling was carried out using a 240 grit polished roll, as a result of which the surface roughness (Ra) was made at most 0.12 μm.

For some of the stainless steel plates (Nos. 1, 3-6, 8-14, 16-18, 20-22, 27-32, 34, and 35 in Table 3), stress relief annealing was carried out with a tension of 0.2 MPa at the temperature and for the time shown in Table 3.

The average grain diameter of each metal plate produced in this manner was determined in the following manner. Using a test piece of a metal plate after final annealing, the average grain diameter was measured at 5 randomly selected points by the above-described method, and their average value was made the average grain diameter, which is shown in Table 3. Crystal grain boundaries are substantially maintained during temper rolling and stress relief annealing. Therefore, even when stress relief annealing was carried out, the average grain diameter of the metal plate obtained after stress relief annealing is thought to be substantially the same as after final annealing.

Each of the resulting metal plates was subjected to laser processing. Laser processing was carried out by irradiating with a YAG laser (pulsed oscillation type) with an output of 15 watts, a spot diameter of 40 μm, and an assist gas of oxygen (7 kg/cm$^2$) so as to automatically form a patterned image.

The amount of hole spreading of the small holes formed in each metal plate (the value of [3a-3b] in FIG. 2(A)) was measured. The amount of hole spreading was measured at 5 randomly selected locations on each metal plate, and their average value was made the amount of hole spreading. The hole spreading percentage was calculated as (amount of hole spreading/plate thickness)×100.

For some austenitic stainless steel plates, the maximum dross thickness and the maximum burr height (see FIG. 2(B)) after laser processing and the curvature of warping after half etching were measured.

In order to measure the maximum dross thickness, a test piece of a cross section of small holes was prepared by cutting a stainless steel plate which had undergone laser processing so as to run through approximately the center of small holes followed by embedding in a transparent resin. The cut cross section of the test piece was polished and then subjected to electrolytic etching using 10% oxalic acid. The thickness of dross was measured using an optical microscope or an SEM (scanning electron microscope) at a magnification of 1000×, and the maximum thickness among 10 randomly selected measurement points was made the maximum dross thickness.

Similarly, a test piece of a cross section of holes embedded in a resin was used for measurement of the maximum burr height. The height of burrs formed on the periphery of small holes on the surface on the opposite side from the laser irradiation surface was measured at 10 randomly selected points, and the maximum height was made the maximum burr height.

The curvature of warping after half etching was determined by cutting a test piece having a width of t×12 mm (t=plate thickness) and a length of 100 mm from a stainless steel plate after temper rolling, masking one side and the side surfaces, and performing chemical etching on the exposed side to decrease the plate thickness by ½. After etching, the test piece was placed atop a surface table and one end of the test piece was pressed against the surface of the table. The gap A (mm) between the other end of the test piece and the table was measured, and from the radius of warping θ calculated from the equation A=L(1−cos(θ))/θ (L=length of test piece=100 mm), the value of the curvature of warping was calculated as 1/R (R=radius of curvature (R=L/θ)).

The curvature of warping was determined in the same manner for the test piece before half etching, and the increment ρ in the curvature of warping after half etching was calculated. The results are shown in Table 3 by the following evaluation standard.

Evaluation Standard for the Increment in the Curvature of Warping ρ

Excellent: ρ≤0.0030
Good: 0.0031>ρ≥0.0100
Poor: 0.0010>ρ≥0.0500
Extremely poor: ρ>0.0500

TABLE 3

| No. | Metal type | Thickness (mm) | Reduction before annealing (%) | Final annealing Temp. (° C.) | Final annealing Time (s) | Temper rolling reduction (%) | Stress relief annealing Temp. (° C.) | Stress relief annealing Time (s) | Average grain diameter (μm) |
|---|---|---|---|---|---|---|---|---|---|
| 1 | A1 | 0.25 | 65 | 800 | 40 | 45 | 720 | 50 | 2 |
| 2 | | | 65 | 825 | 40 | 30 | — | — | 2.8 |
| 3 | | | 50 | 825 | 40 | 45 | 500 | 50 | 3.5 |
| 4 | | | 50 | 825 | 40 | 20 | 720 | 50 | 4.7 |
| 5 | | | 30 | 950 | 40 | 30 | 820 | 50 | 9.5 |
| 6 | | | 60 | 1000 | 40 | 30 | 500 | 50 | 18.5* |
| 7 | | | 50 | 1000 | 40 | 30 | — | — | 19* |
| 8 | | | 30 | 1100 | 40 | 45 | 700 | 50 | 22.5* |
| 9 | | | 15 | 850 | 40 | 30 | 720 | 50 | 27.8* |
| 10 | A2 | | 60 | 825 | 40 | 45 | 820 | 50 | 8.8 |
| 11 | | | 50 | 1100 | 40 | 45 | 720 | 50 | 23.1* |
| 12 | B1 | | 60 | 880 | 40 | 25 | 700 | 50 | 5 |
| 13 | | | 30 | 900 | 40 | 40 | 820 | 50 | 5.6 |
| 14 | | | 50 | 1000 | 40 | 30 | 600 | 50 | 13.4* |
| 15 | | | 50 | 1130 | 40 | 30 | — | — | 25.1* |
| 16 | | | 15 | 880 | 40 | 30 | 700 | 50 | 26.5* |
| 17 | B2 | | 50 | 1130 | 40 | 30 | 600 | 50 | 24.6* |
| 18 | C | | 70 | 700 | 40 | 30 | 400 | 50 | 4.1 |
| 19 | | | 40 | 820 | 40 | 20 | — | — | 5.6 |
| 20 | | | 80 | 850 | 40 | 30 | 400 | 50 | 13.2* |
| 21 | | | 70 | 870 | 40 | 25 | 450 | 50 | 15.9* |
| 22 | | | 65 | 900 | 40 | 30 | 500 | 50 | 20.3* |
| 23 | D | | 70 | 600 | 50 | 40 | — | — | 5.1 |
| 24 | | | 60 | 700 | 50 | 20 | — | — | 9.1 |
| 25 | | | 50 | 750 | 50 | 30 | — | — | 12.8* |
| 26 | | | 55 | 800 | 50 | 30 | — | — | 22.1* |
| 27 | A1 | 0.15 | 60 | 800 | 30 | 40 | 720 | 35 | 2.5 |
| 28 | | | 60 | 850 | 30 | 25 | 800 | 35 | 4.1 |
| 29 | | | 55 | 850 | 30 | 45 | 650 | 35 | 5.4 |
| 30 | | | 30 | 1000 | 30 | 30 | 720 | 35 | 15.2* |
| 31 | | | 45 | 1130 | 30 | 40 | 800 | 35 | 24.3* |
| 32 | | 0.3 | 60 | 825 | 60 | 30 | 800 | 65 | 3.7 |
| 33 | | | 50 | 850 | 60 | 25 | — | — | 11.3 |
| 34 | | | 40 | 1000 | 60 | 40 | 550 | 65 | 15* |
| 35 | | | 45 | 1130 | 60 | 30 | 700 | 65 | 22.7* |

TABLE 3-continued

| No. | Right side of Eq. (1) (μm) | Hole spreading Amount (μm) | Hole spreading % (%) | Max. dross thickness (μm) | Max. Burr height (μm) | ρ[1] | Remark |
|---|---|---|---|---|---|---|---|
| 1 | 9.92 | 8 | 3.2 | 1.3 | 1.8 | Excel. | Invent. |
| 2 | | 9 | 3.6 | — | — | Excel. | |
| 3 | | 11 | 4.4 | — | — | — | |
| 4 | | 11 | 4.4 | 1.8 | 2.3 | Excel. | |
| 5 | | 24 | 9.6 | 1.6 | 2.7 | Excel. | |
| 6 | | 43 | 17.2 | — | — | Good | Compar. |
| 7 | | 47 | 18.8 | — | — | Poor | |
| 8 | | 50 | 20 | 2.2 | 3.6 | Good | |
| 9 | | 58 | 23.2 | 5.3 | 9.5 | Poor | |
| 10 | | 23 | 9.2 | 2.8 | 4.2 | Excel. | Invent. |
| 11 | | 56 | 22.4 | 4.7 | 8.8 | — | Compar. |
| 12 | | 13 | 5.2 | 1.5 | 2.3 | Excel. | Invent. |
| 13 | | 16 | 6.4 | 2.1 | 3.1 | Excel. | |
| 14 | | 28 | 11.2 | 2.5 | 3.8 | Poor | Compar. |
| 15 | | 58 | 23.2 | — | — | Ex. poor | |
| 16 | | 56 | 22.4 | — | — | Poor | |
| 17 | | 57 | 22.8 | 5.1 | 9.2 | — | |
| 18 | | 12 | 4.8 | — | — | — | Invent. |
| 19 | | 16 | 6.4 | — | — | — | |
| 20 | | 31 | 12.4 | — | — | — | Compar. |
| 21 | | 39 | 15.6 | — | — | — | |
| 22 | | 44 | 17.6 | — | — | — | |
| 23 | | 15 | 6 | — | — | — | Invent. |
| 24 | | 21 | 8.4 | — | — | — | |
| 25 | | 34 | 13.6 | — | — | — | Compar. |
| 26 | | 54 | 21.6 | — | — | — | |
| 27 | 5.44 | 7 | 4.7 | — | — | — | Invent |
| 28 | | 9 | 6 | — | — | — | |
| 29 | | 13 | 8.7 | — | — | — | |
| 30 | | 35 | 23.3 | — | — | — | Compar. |
| 31 | | 52 | 34.7 | — | — | — | |
| 32 | 12.16 | 14 | 4.7 | — | — | — | Invent. |
| 33 | | 28 | 9.3 | — | — | — | |
| 34 | | 43 | 14.3 | — | — | — | Compar. |
| 35 | | 58 | 19.3 | — | — | — | |

*indicates a value outside the range of the present invention;
[1] ρ = increment in curvature after half etching.

As is clear from the results in Table 3, regardless of the plate thickness and type of metal plate, in all of the examples of the present invention, the percent of hole spreading was at most 10% (namely, the amount of hole spreading was at most 10% of the plate thickness), which means that highly accurate small holes with little hole spreading could be formed by laser processing. The dross amount and burr height after laser processing were also small. In addition, warping after half etching was extremely small.

In contrast, in the comparative examples, regardless of the material of the metal plate, the final annealing temperature was high and the relationship between the average grain diameter and the plate thickness did not satisfy the present invention. Therefore, the amount of hole spreading exceeded 10% of the plate thickness and the accuracy of small holes was poor. Nos. 10, 11, and 17 are examples of austenitic stainless steel plates having a low S content. As shown by these examples, with a low S content, there is a tendency for the dross thickness and the burr height to increase.

The invention claimed is:
1. A method of making a metal mask comprising:
providing a metal plate selected from an austenitic stainless steel plate, a ferritic stainless steel plate, and a titanium plate, the metal plate having a centerline surface roughness of at most 0.16 μm, a plate thickness t of at most 400 μm, and an average grain diameter d, wherein the plate thickness t and average grain diameter d satisfy the following Equation (1):

$$d \leq 0.0448 \cdot t - 1.28 \quad (1);$$

where a unit of d and t is μm;
cutting the metal plate into a metal mask using a laser beam so that a pattern of holes or slits is formed in the metal mask;
the metal plate having a spreading value of at most 10% of the plate thickness wherein the spreading value is determined by subtracting a cut width of the hole or slit in a surface of the metal plate on an exit side of the laser beam from a cut width of the hole or slit in a surface of the metal plate on an incident side of the laser beam.

* * * * *

UNITED STATES PATENT AND TRADEMARK OFFICE
CERTIFICATE OF CORRECTION

PATENT NO. : 10,744,600 B2  
APPLICATION NO. : 15/489835  
DATED : August 18, 2020  
INVENTOR(S) : Fujisawa et al.

Page 1 of 1

It is certified that error appears in the above-identified patent and that said Letters Patent is hereby corrected as shown below:

On the Title Page

Item (56) References Cited  
Column 2, U.S. Patent Documents, Line 12:  
5,909,979 6/1999 Winzen  
Should read:  
5,509,979 4/1996 Kimura Signed and Sealed this  
Twenty-seventh Day of April, 2021

Drew Hirshfeld  
*Performing the Functions and Duties of the*  
*Under Secretary of Commerce for Intellectual Property and*  
*Director of the United States Patent and Trademark Office*